Oct. 7, 1969     R. D. HOUK     3,470,762
STEERING CONTROL

Filed Aug. 21, 1967     3 Sheets-Sheet 2

INVENTOR.
RICHARD D. HOUK
BY Hamilton & Cook
ATTORNEYS

Oct. 7, 1969  R. D. HOUK  3,470,762
STEERING CONTROL
Filed Aug. 21, 1967  3 Sheets-Sheet 3

INVENTOR.
RICHARD D. HOUK
BY Hamilton & Cook
ATTORNEYS

United States Patent Office 3,470,762
Patented Oct. 7, 1969

3,470,762
STEERING CONTROL
Richard D. Houk, Stow, Ohio, assignor, by mesne assignments, to North American Rockwell Corporation, Pittsburgh, Pa., a corporation of Delaware
Filed Aug. 21, 1967, Ser. No. 662,073
Int. Cl. F16c 1/10
U.S. Cl. 74—502                                1 Claim

ABSTRACT OF THE DISCLOSURE

A steering control particularly adapted for marine installations utilizing push-pull control cables. The casing of the push-pull cable is fastened to the housing of the control, and the core is attached to a slide block reciprocatingly movable in a slide way within the housing. A worm shaft is journaled in the housing for rotation adjacent the slide way. Rolled threads on the worm shaft mesh with flat-crested teeth on the slide block so that selective rotation of the worm shaft, as by a wheel, causes the slide block, and the core attached thereto, to slide in one direction or the other.

Background of the invention

Historically marine steering assemblies have utilized rope and pulley or other "balanced" control systems when it was desired to position the helmsman remotely of the tiller. "Balanced" remote control systems are almost as old as ships themselves and, when used as steering mechanisms, have traditionally comprised a wheel and shaft with a rope drum to provide the required movement of the rope necessary to operate the rudder or other controllably driven components. The appellation "balanced system" appears quite appropriate when it is realized that the mechanical motion transmitting ropes, or cables, form a closed system because of their inability to relay mechanical motion by other than tensile stresses.

These balanced systems are still widely used, and an example is shown in U.S. Patent No. 2,737,822 to John F. Morse. However, they are quite bulky and cumbersome, and misalignment between the guiding pulleys, rope drum, rudder connection, or any other components can cause excessive binding and wear to the system.

The advent of the push-pull control cable, an excellent example of which can be found in U.S. Patent No. 3,320,665, also to John F. Morse, provided in a single cable the necessary structure for effecting remote control by the application of either tensile or compressive forces. The push-pull cable thus provided a transfer device which overcomes the difficulties incident to balanced systems, and is particularly easy to install in a conventional boat either during or after construction of the boat, without requiring specialized engineering or mechanical ability.

Actuation of the core of the push-pull cable, however, requires something more than the rope drum of the balanced system, and complex steering controls have been developed to translate the rotative motion of the steering wheel into the linear motion of the push-pull control cable core. Reduced to their fundamental components, all present known steering controls for use with push-pull cables have three basic elements built into the helm: a "conversion mechanism," i.e., the means for converting rotative motion into linear motion; a "transfer connection," i.e., the means for receiving the linear motion from the "conversion mechanism" and imparting it to the core of the push-pull cable; and, a "ratio drive," i.e., the means for attaching the helmsman's wheel to the "conversion mechanism" with a mechanical advantage favorable to the facile rotation of the wheel.

Some presently known steering controls combine the conversion mechanism and the ratio drive into one housing and use a separate housing for the transfer connection. This arrangement is quite reliable, and, particularly if the transfer connection is adjustably positionable, as shown in U.S. Patent No. 3,208,300 to John F. Morse, allows considerable adaptability to a variety of mounting conditions. Nevertheless, such a steering control does require space for positioning the transfer connection in at least one direction generally transverse the conversion mechanism, or at least parallel to the mounting panel at the helm.

A second approach has been to combine the conversion mechanism and the transfer connection into one housing. This construction requires a housing having considerable dimension in all directions inasmuch as the housing is generally circular, as shown in U.S. Patent No. 2,767,596 to Milton Simon et al.

However, irrespective of the construction employed, the Boating Industry Association (BIA) dictates that there must be at least 7½ inches clearance between the bulkhead mounting panel and the steering wheel for safety purposes. For this reason all prior known steering constructions employ a shaft in the ratio drive component having an axial dimension sufficient to comply with this BIA standard. These constructions thus waste considerable space between the wheel and the bulkhead at the expense of ofttimes very crucial space behind the bulkhead.

Summary of the invention

It is therefore a primary object of the present invention to provide a steering control for use with motion transfer mechanisms of the push-pull cable variety which requires relatively little transverse space behind the bulkhead mounting panel.

It is another object of the present invention to provide a steering control, as above, in which the conversion mechanism, the transfer connection and the ratio drive are enclosed in a single housing.

It is a further object of the present invention to provide a steering control, as above, in which at least a portion of the conversion mechanism, the transfer connection and the ratio drive are contained in that portion of the housing which extends outwardly of the bulkhead mounting panel toward the wheel.

It is a still further object of the present invention to provide a steering control, as above, which is readily adaptable for single or twin inboard, outboard or outdrive propulsion units and which will provide simultaneous steering of one or more such units by attaching one or more push-pull cable assemblies to the stardard steering control without the necessity of using complicated accessories.

These and other objects of the present invention will become apparent from the following specification and are accomplished by means hereinafter described and claimed.

In general, a steering control embodying the concept of the present invention is contained in a single housing mountable on a panel of the bulkhead at the helm location. A worm shaft, rotatable by a wheel, is journaled in the housing. The radially outer surface of the worm shaft is preferably provided with rolled threads which engage a plurality of teeth on a slide block. The slide block is reciprocatingly received in a slide way recessed into the housing along the worm shaft and is secured to the core of a push-pull cable, the casing of which is fastened to the housing of the control. Selective rotation of the wheel causes the slide block to slide in one direction or the other to reciprocate the core as desired. The crest of each tooth on the slide block is substantially flat so as to lie in a plane parallel with a tangent to the worm shaft.

One preferred embodiment of the present invention is shown by way of example in the accompanying drawings and hereinafter described in detail without attempting to show all of the various forms and modifications in which the invention might be embodied; the invention being measured by the appended claims and not the details of the specification.

Description of the preferred embodiment

Figure 1:
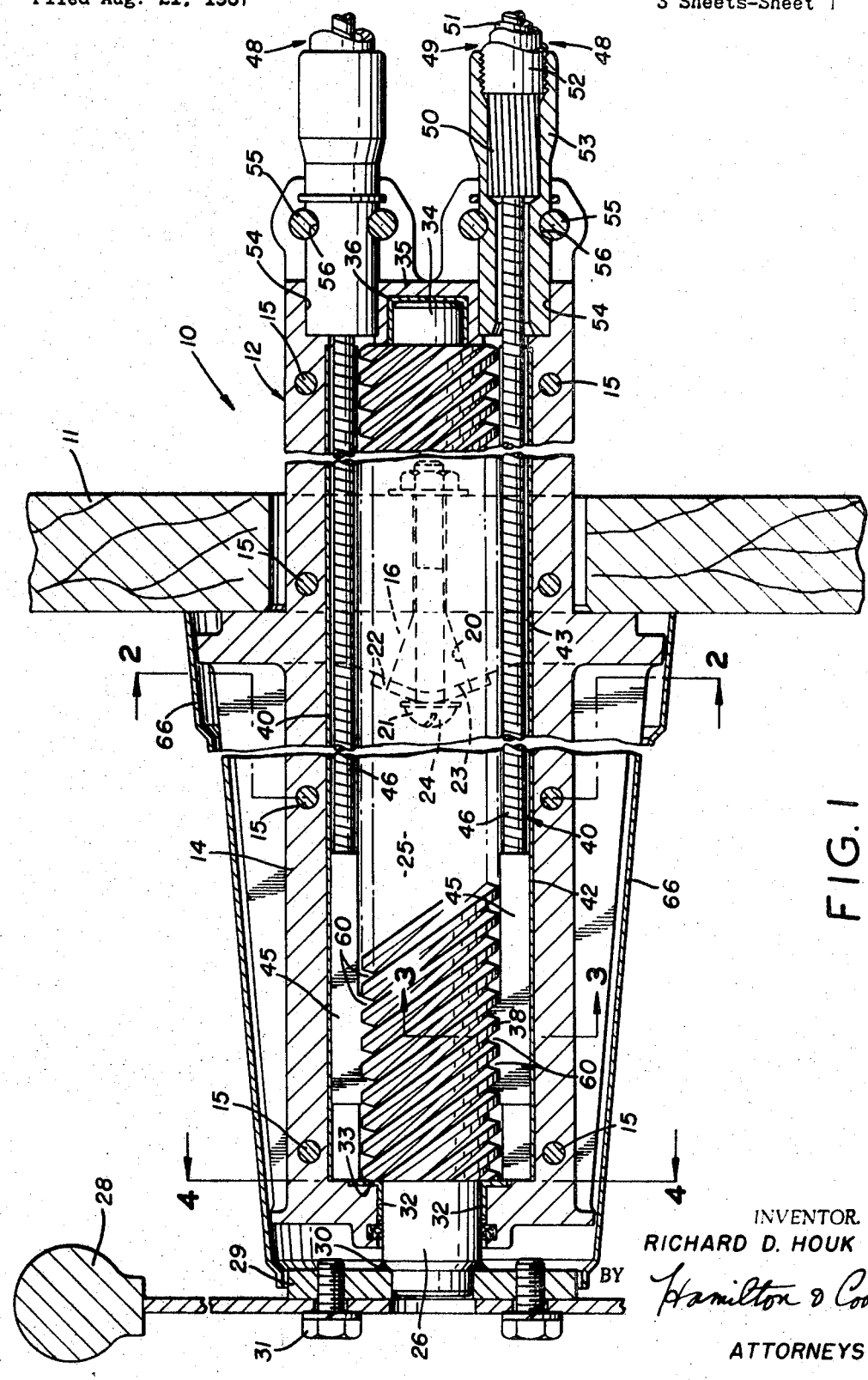
FIG. 1 is a longitudinal cross section through a steering control embodying the concept of the present invention.

Referring more particularly to the drawings, the improved steering head control, indicated generally by the numeral 10, is depicted as mounted on the bulkhead mounting panel 11. The housing 12 may be formed in two mating halves 13 and 14 joinable by a plurality of cap screws 15. A mounting flange 16 extends transversely outwardly of each half 13 and 14 of housing 12 and may be reinforced by a pair of ribs 18 and 19 extending axially of the housing.

Each mounting flange has a slot 20, or other perforation, to receive the mounting bolts 21. As shown, the slot 20 may be flared away from the panel 11 to accommodate an inclined orientation of the bolt 21. In this event a washer 22 can be provided to span the flared slot 20. As best seen in FIG. 1 the upper surface 23 of the mounting flange 16 may be of arcuate configuration in which event the washer 22 is also preferably arcuate in order to provide the optimum contact between the head 24 of the mounting bolt 21, the washer 22 and the mounting flange 16 even if the bolt 21 were canted.

Journaled within the housing 12 is the worm shaft 25. A first reduced end 26 of the shaft 25 extends through the housing 12 and mounts the helm wheel 28. Any number of ways can be envisioned for nonrotatably securing the wheel 28 to the worm shaft 25. As shown, a cap plate 29 may be welded, at 30, to that end 26 of the shaft 25 protruding beyond the housing 12, and a plurality of cap bolts 31 used to fasten the wheel 28 to the cap plate 29.

Two semiannular flanged bushings 32 are inserted in opposed relation between the housing 12 and the worm shaft 25 to engage both the reduced end 26 and the shoulder 33 where the end 26 joins the main portion of the shaft 25. In this way the bushing supports both axial and radial thrust loading on the shaft.

The second, or opposite end 34 of the worm shaft 25 is also of reduced diameter and is rotatably received in a journal box 35 formed in the housing 12. A cup bushing 36 is provided between the end 34 and the journal box 35, this also to support both axial and radial thrust loading on the shaft.

The main portion of the worm shaft 25 between ends 26 and 34 is fashioned with rolled threads 38 the teeth of which are preferably of the revised ACME form. The use of rolled thread has many advantages not the least of which is that the cost of rolling a thread is far less than the cost of conventional thread cutting. In addition, because rolled threads are cold formed by displacing metal with dies, the sliding action of the dies as they form the threads gives a burnishing action which not only work hardens the threads but also leaves no burrs. These are both important attributes for the threads 38 on the worm shaft 25 to possess, as will hereinafter become apparent.

One or more slide ways 40 extend along the interior of the housing 12. These ways 40 are adjacent the worm shaft 25 and are preferably U-shaped with their plane of symmetry 41 being aligned radially with shaft 25. The interior of each way must present a smoothly finished surface which imparts as little frictional resistance as possible and is not readily subject to galling. In order to permit the housing itself to be made as a less expensive casting, an insert 42, such as the extra bright stainless steel shown, may be inserted into each way cavity 43 in the housing to provide the desired finish.

A block 45 is slidably received in the way 40 for reciprocating motion therein. This block 45 is affixed, as by swaging, to the core 46 of a push-pull cable 48.

A push-pull control cable 48 comprises not only the core 46 but also the casing 49 in which the core 46 is reciprocatingly slidable. The prior art knows many casing constructions, one of which is depicted environmentally in FIG. 1. The casing 49 comprises a plurality of wires 50 contiguously laid in the form of a helical coil about the radially outer surface of an inner, flexible tube 51 which extends the full length of the casing 49. An outer, flexible cover 52 encases the coil of wires 50 and extends along the entire casing to generally within a short distance from the end of the wires.

A fitting 53 is positioned over the end of the wires 50 and cover 52 and securely attached thereto, as by swaging. The fitting 53 is received within a recess 54 in the housing 12, and one or more anchor bolts 55 extend transversely across the recess 54 and through a groove 56 in the outer surface of the fitting 53 to secure the cable casing 49 to the housing 12. The recess 54 is so located that the core 46 aligns with and is suitably received in the corresponding way 40.

Particular attention is directed to the slide block 45. The block 45 must slide freely in the way 40 to actuate the cable core 46. Thus there must be a modicum of clearance between the side walls 58 and 59 of insert 42 and the slide block 45. Moreover, engagement of the block 45 with the worm shaft 25 must induce the desired movement of the block axially along the worm shaft 25.

Figure 3:
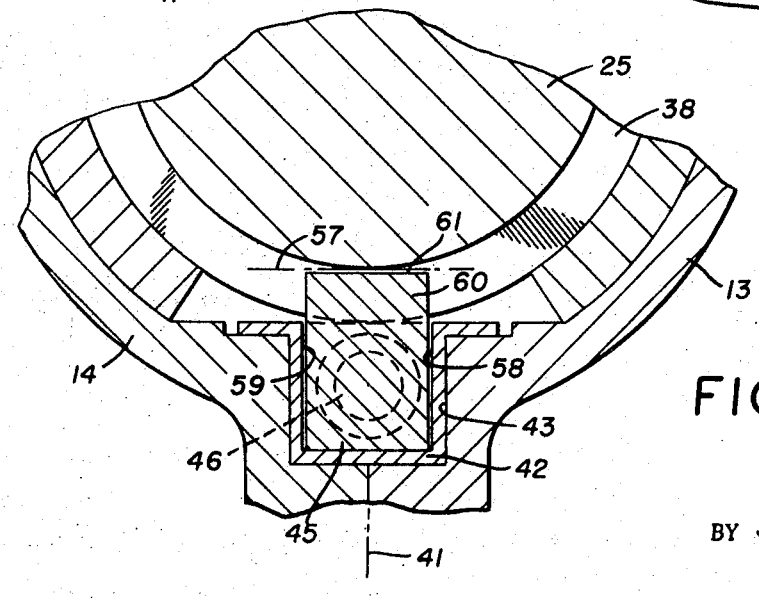
FIG. 3 is a further enlarged cross section taken substantially on line 3—3 of FIG. 1.
Figure 4:
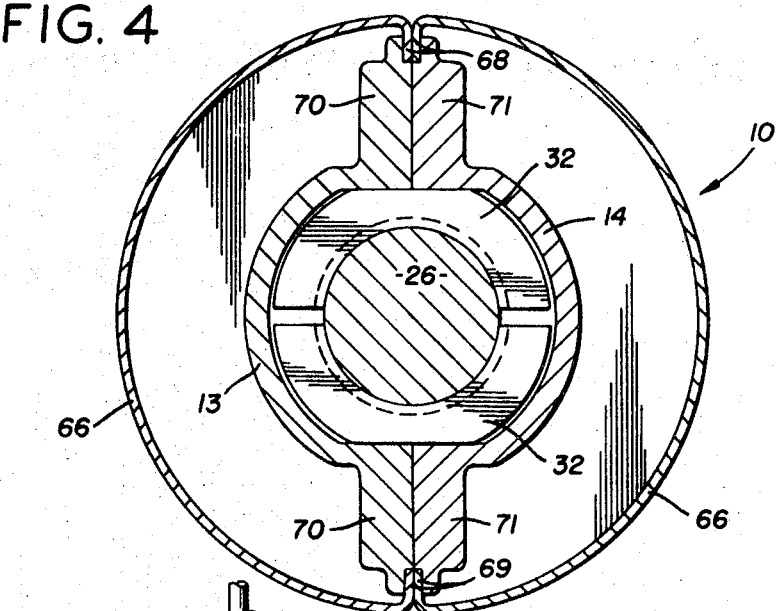
FIG. 4 is also an enlarged cross section taken substantially on line 4—4 of FIG. 1; and, FIG. 5 is a top plan view, partly broken away and partly in section, of a portion of the steering control depicted in FIG. 1 depicting an indicating means operatively attached thereto.

The teeth 60 on slide block 45, as best shown in FIG. 3, are not the type expected from the design of teeth for the gear in a single enveloping worm gearing arrangement. The crest of such teeth is concave with the throat having a radius of concavity equal to approximately one-half the pitch diameter of the worm minus the addendum. Such a tooth design, while most satisfactory for worm gearing design in general, does not suffice for the teeth 60 on the slide block 45. It has been found that with concave teeth on block 45, the block will tend to lock against the worm shaft 25 rather than slide axially therealong. However, by making the crest 61 of the teeth 60 substantially flat this locking tendency is precluded and a most efficient steering control results. That is, with the way 40 symmetrical the crest 61 of the teeth 60 will lie transversely of the axis of symmetry 41 in a plane generally parallel with a tangent 57 to the worm shaft 25.

And, more than one control cable may be attached to this steering control, one way 40 being required for each cable. Hence, in the preferred embodiment disclosed two cables may be attached thereto without alteration. Should more cables be desired, the housing could be modified to include additional ways.

Figure 5:
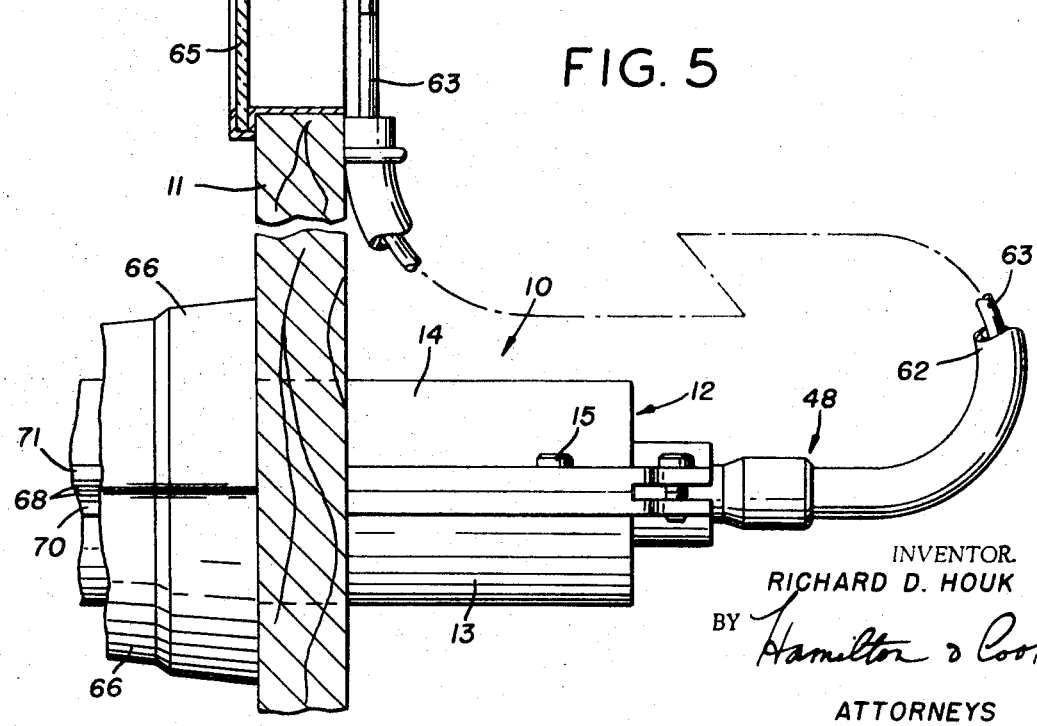

One way in addition to the number required for the number of push-pull cables attached may be used to accommodate an actuator for a rudder position indicator (FIG. 5). The simplest form would utilize a tube 62 attached to the housing 12 in which a cable core-like strand 63 is slidably received. A slide block (not shown), similar to block 45, attached to the strand 63 similarly engages worm shaft 25 so that the movement of the strand 63 in tube 62 corresponds exactly to the movement of the core 46 in push-pull cable 48. This, with at least a portion of the tube 62 being transparent and positioned in front of a reference scale 65 the relative position of a mark 67 on strand 63, or even the end thereof, with respect to the scale 65 would show the relative position of the rudder, or other device, being controlled by the push-pull cable 48.

Another drawback to many prior known constructions is the lack of support to the cable core between the point at which it leaves the casing and the point at which it is attached to the conversion mechanism. Under tensile loading, this may make little or no difference. However, under compressive loading the core will buckle unless properly supported. Inasmuch as the slide block 45 can be fabricated to have only slightly larger cross sectional dimensions than the diameter of the core 46, the core will be comparatively closely supported on four sides—three sides by the insert 42 and on the fourth side by the worm shaft 25 along its addendum circle. The three walls of the insert 42 provide polished surfaces against which the core 46 can freely slide, and the rolled threads 38 on worm shaft 25 also provide a near perfect support. Any portion of the core 46 which is urged against the smooth, hard surface of the rolled threads will tend to be assisted in its movement by the threads as they wipe along the core. The axial component of this wiping action is in the same direction as the core is moving so that the action of the threads 38 on the core is complementary to the action of the threads 38 on the slide block 45.

Figure 2:
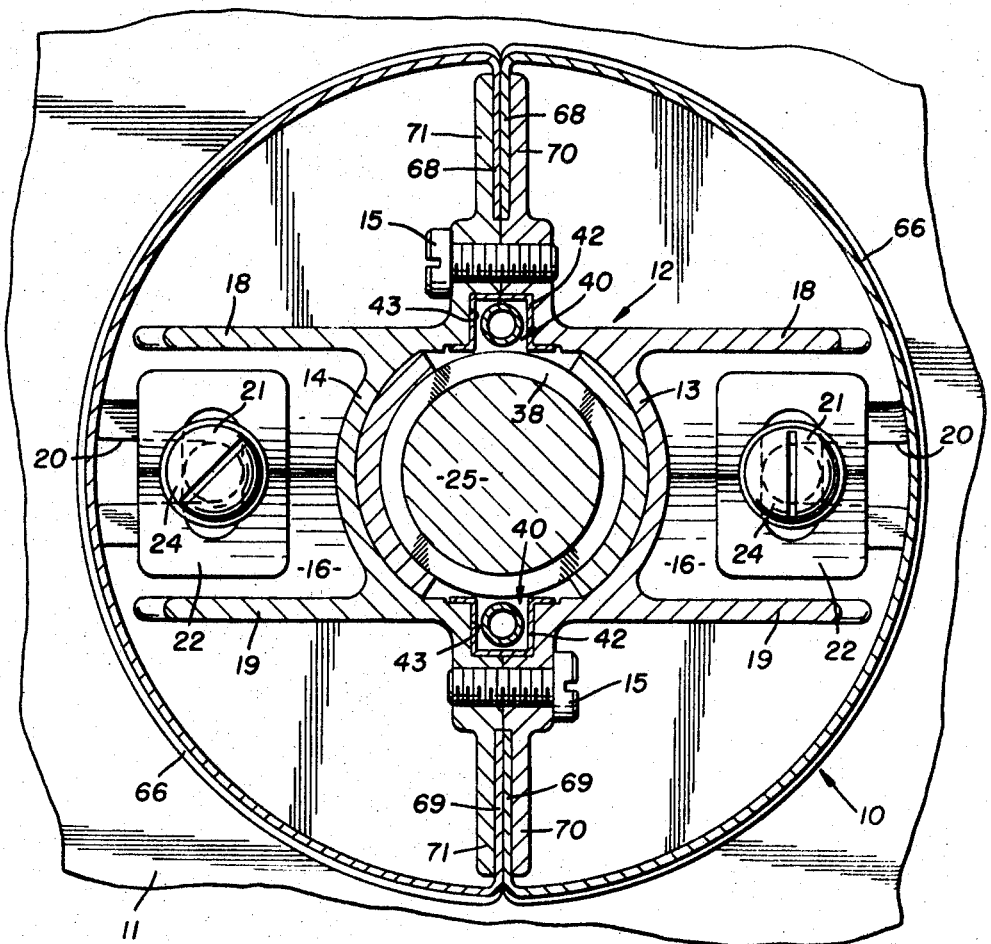
FIG. 2 is an enlarged cross section taken substantially on line 2—2 of FIG. 1.

Finally, the subject control can be dressed with an elegant appearance simply by the addition of a skirt 66. As best seen in FIG. 2, the skirt may be made in two identical halves which are secured to the housing 12 by a pair of inwardly extending lips 68 and 69 which are frictionally receivable between the ribs 70 and 71 on the opposed halves 13 and 14 of housing 12.

A steering control constructed according to the concept of the present invention is therefore readily adaptable for use with a push-pull cable without the necessity of utilizing transverse space behind the bulkhead panel on which it is mounted. The present steering control also contains the "conversion mechanism," the "transfer connection" and the "ratio drive" all in a single housing, a large portion of which extends between the bulkhead mounting panel and the wheel in that space which has heretofore been utilized for little more than a simple shaft popularly referred to as the steering column, and otherwise accomplishes the objects of the invention.

I claim:

1. A steering control for actuating a core slidable in the casing of a push-pull control cable, said steering control comprising, a housing to which the casing of a push-pull cable is anchored, a threaded worm shaft journaled in said housing, wheel means for selectively rotating said worm shaft, at least one slide way being provided in said housing, said slide way being parallel with and contiguous to said worm shaft, a slide block reciprocatingly movable in said slide way, the core of a push-pull cable attached to said slide block, a plurality of teeth on said slide block meshed with the threads on said worm shaft for moving said slide block axially of said worm shaft in response to rotation of said worm shaft in either direction, each said tooth having a crest, each said crest being substantially flat so that the said teeth engage the threads on the worm shaft with the crests lying in a plane parallel to a tangent to said worm shaft.

References Cited

UNITED STATES PATENTS 1,835,631   12/1931   Bradley _____ 74—502

FOREIGN PATENTS 424,814   2/1935   Great Britain.

FRED C. MATTERN, Jr., Primary Examiner

JAMES A. WONG, Assistant Examiner